3,420,873
OXIDATIVE CARBONYLATION AND CATALYST RECOVERY

Kenneth L. Olivier, Placentia, Calif., assignor to Union Oil Company of California, Los Angeles, Calif., a corporation of California
No Drawing. Filed Oct. 11, 1966, Ser. No. 585,736
U.S. Cl. 260—497     7 Claims
Int. Cl. C07c *51/20;* C07c *57/04*

This invention relates to a method for the recovery of catalyst from reaction media that have been employed for the liquid phase oxidation of olefins to valuable oxygenated compounds and in particular relates to the recovery of the metal catalyst salts including a platinum group metal and redox metal salts employed in such oxidation.

In copending application Ser. No. 371,751, a process for the oxidative carbonylation of hydrocarbon olefins is disclosed that employs a platinum group metal salt as a catalyst. This oxidation is performed in anhydrous or substantially anhydrous organic reaction media and involves the formation of an olefin complex with a soluble salt of the platinum metal, e.g., palladium chloride. This reaction is performed in the presence of oxygen and carbon monoxide and the olefin is oxidatively carbonylated to prepare an alpha-beta unsaturated carboxylic acid or to prepare a beta-acyloxy alkanoic acid.

The reaction is performed in the presence of a substantially anhydrous organic reaction medium. The reaction medium should contain a low molecular weight carboxylic acid although the majority of the reaction media can be any other inert organic liquid having the solvency for the catalyst components and the olefin being oxidized. The reaction is performed under substantially anhydrous conditions and, accordingly, the reaction medium should contain less than about 10 weight percent water. In the oxidative carbonylation it is preferred that the reaction be performed under entirely anhydrous conditions since the presence of the water will promote less desired reactions.

In the oxidative carbonylation reaction the olefin can be oxidized and carbonylated in a single reaction zone to prepare high yields of alpha, beta-unsaturated carboxylic acids or beta-acyloxy carboxylic acids. In this process, carbon monoxide is introduced simultaneously with the olefin to contact the reaction medium. Acrylic acid and beta-acetoxy propionic acid can be achieved in high yields from ethylene and carbon monoxide according to this process.

The oxidation of the olefin reduces a stoichiometric quantity of the cations of the platinum group metal to a lower valency, generally to the free metal state. To provide a commercially attractive process, various redox agents are included in the reaction medium to provide an oxidizing environment which will restore the reduced platinum group metal to the ionic state for reuse in the oxidation. These redox metals are themselves reduced to a lower valency state and, when substantially all the quantities of redox agent have been reduced to a lower valency, it is necessary to reoxidize the catalyst to its higher valency state.

The oxidation of the catalyst to restore the catalyst to its higher valency is accomplished with molecular oxygen. The oxygen can be introduced simultaneously into the reaction zone to oxidize the catalyst in situ and this is the preferred technique. In other embodiments the reduced solution can be withdrawn from the reaction zone and, with or without product recovery, passed to a second reaction zone wherein it is contacted with oxygen.

After the oxidation has been performed for a considerable length of time and the reaction medium has been used repeatedly, there accumulates an objectionable quantity of high-boiling material in the reaction medium. To maintain activity of the reaction medium for the desired oxidation, it is necessary to withdraw a portion of the reaction medium and replenish the medium with fresh solution and catalyst salts. The withdrawn portion of the reaction medium, however, contains a substantial quantity of the catalyst. For economical processing it is necessary to recover the catalyst for reuse in the oxidation. Efficient recovery of the catalyst is difficult because of the nature of the contaminants in the reaction medium; these are generally high-boiling tarry fractions which interfere with most extraction or separation techniques.

It is an object of this invention to provide an efficient method for the recovery of catalyst from the reaction medium employed for the oxidative carbonylation of olefins.

It is likewise a purpose of this invention to provide an efficient and continuous method for the catalytic oxidative carbonylation of olefins.

It is a specific object of this invention to provide a method for the recovery of platinum group metal values from an organic reaction medium.

It is a further object of this invention to provide a technique which recovers the catalyst in a suitable form for the direct recycling to the reaction zone.

Other and related objects will be apparent from the description of the invention.

I have now found that the catalyst values can be readily obtained for reuse by recovery from the reaction medium by removing from 1 to about 20 weight percent of the reaction medium from the remainder of the reaction medium, distilling the removed portion to recover substantially all of the reaction products and solvent, admixing the residue from the distillation step with dilute, aqueous mineral acid and an organic diluent hereinafter described to extract the catalyst values from the reaction medium into the aqueous phase. The aqueous phase can then be treated to recover the catalyst by evaporation of the solvent or treatment with a reducing agent to precipitate the catalyst values which can then be recovered by conventional means, e.g., filtration.

Organic diluents which can be used for dilution of the reaction medium comprise any organic liquids that have a solubility for the tarry constituents of the reaction medium, e.g., polyacrylic acid, etc., and that have a limited water solubility to provide a two-phase system with the dilute aqueous mineral acid. Organic liquids which have been found to be well suited for this purpose include alcohols, esters and ketones having from 4 to about 7 carbon atoms and including the monohydroxy acyclic and alicyclic alcohols and ketones such as butanol, isobutanol, t-amyl alcohol, cyclohexanol, 2-ethylbutanol, cyclohexanone, heptanol, etc. Also included as useful organic diluents are the esters of acyclic monocarboxylic acids and acyclic and alicyclic alcohols or glycols such as ethyl acetate, methyl propionate, glycol diacetate, ethylidene diacetate, butyl acetate, amyl acetate, propylene glycol diacetate, etc. Esters of dicarboxylic acids and acyclic alcohols are also useful such as dimethyl oxalate, diethyl oxalate, diethyl malonate, dimethyl succinate, etc.

The removed portion of the reaction medium is contacted with a strong mineral acid that will form water soluble salts with the metal components of the catalyst. Any mineral acid forming soluble salts with the Group VIII noble metals and with the multivalent metal cations used in the redox agent hereinafter defined can be employed. Examples of suitable acids include sulfuric acid, nitric acid, the hydrohalic acids, i.e., hydrochloric and hydrobromic acid, etc. Mixtures of any of the aforementioned acids can also be used and of the aforementioned acids hydrochloric and nitric acids are preferred, most preferably in combination. The acid is simply admixed with tarry residue at a temperature from about 20° to about 150° C.; preferably from about 50° to about 100° C. The acid strength can be from 0.1 to about 10 normal; preferably from about 0.5 to about 5 normal, and a sufficient quantity from about 0.5 to about 10 volumes per volume of residue is used to insure complete extraction of the catalyst values from the reaction medium.

The organic diluent can be added to the residue before, during or after the reaction with the mineral acid. The organic diluent dilutes the organic residue and permits a clear separation between the aqueous and organic phases and, therefore, the diluent can be added at any time prior to separation of the phases. It is preferred to add the diluent after the acid has been reacted with the residue to avoid any possibility of reaction between the diluent and the acid at the aforementioned elevated temperatures.

The residue is simply admixed with the organic diluent using from 1 to about 50 volumes; preferably from about 1 to about 10 volumes of the diluent for each volume of the residue. The dilution can be effected at the aforementioned acid reaction temperature when the diluent and acid are simultaneously added. Preferably, however, ambient temperatures from about 20° to about 80° C. are used. The mixture can be stirred or agitated as desired to achieve thorough mixing of the diluent in the residue. The mixture of acid diluent and residue is then permitted to separate into a two-phase system and the organic phase is decanted from the aqueous phase which has been enriched with the catalyst values. The organic phase can be again treated with fresh quantities of acid to insure complete removal of the catalyst values. The aqueous phase is thereafter treated to recover the catalyst components by a suitable treatment such as evaporation of the solvent or contact with a reducing agent such as carbon monoxide, hydrogen or a gaseous olefin to reduce the redox agent to its lower, more insoluble, state. The resulting solids can be dissolved in the reaction medium or can be directly introduced into the reaction zone for further reaction since the oxidizing conditions prevailing in the reaction zone will restore the catalyst components to their active, higher valency state.

As previously mentioned, the oxidation is performed with a hydrocarbon olefin which has from 2 to about 10 carbons, preferably from 2 to about 5 carbons. Examples of suitable olefins include ethylene, propylene, butene, pentene, hexene, heptene, octene, cyclohexene, methylcyclohexene, isopropylcyclohexene, etc. The aliphatic hydrocarbon olefins are preferred, particularly those having from 2 to about 5 carbons and of these ethylene is the most preferred because of the established market values of its products, i.e., chiefly acrylic acid or beta-acetoxypropionic acid with minor yields of vinyl acetate and acetaldehyde.

The reaction is performed under liquid phase conditions in the presence of an organic liquid which has a solvency for the catalyst and which, preferably, is inert to the reaction conditions. Various organic liquids can be employed for this purpose such as sulfones, amides, ketones and esters. The carboxylic acids of the low molecular weight fatty acids or benzene carboxylic acids can also be employed as solvents.

Illustrative of organic solvents that can be employed include alkyl and aryl sulfones such as diisopropyl sulfone, butylamyl sulfone, methylbenzyl sulfone, etc. Another class of organic solvents that have a solvency for the catalyst salts and that are inert to the oxidation conditions are amides such as formamide, N,N-dimethyl formamide, N,N-ethylisopropyl formamide, acetamide, N-phenyl acetamide, N,N-dipropyl acetamide, isobutyramide, N-ethylisobutyramide, isovaleramide, N,N-dimethylisovaleramide, isocaprylamide, N,N-methyl-n-caprylamide, N-propyl-n-heptanoylamide, isoundecylamide, etc.

Various alkyl and aryl ketones can also be employed as a reaction solvent, e.g., acetone, methylethyl ketone, diethyl ketone, diisopropyl ketone, ethyl n-butyl ketone, methyl n-amyl ketone, cyclohexanone diisobutyl ketone, etc.

Various esters can also be employed as a solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-butyl phthalate, etc.

The reaction medium should contain a low molecular weight alkanoic acid in an amount from about 10 to about 50 weight percent. If desired, the low molecular weight acid can be used as the entire reaction medium and this is the preferred embodiment. Illustrative of alkanoic acids which are useful in the reaction are acetic, propionic, butyric, isobutyric, pentanoic, hexanoic, heptanoic, isooctanoic, etc. Of these, the fatty carboxylic acids having from about 2 to about 5 carbons are preferred. The alkanoic acids are not entirely inert under the oxidation conditions in that the alkanoic acid tends to add across the olefinic bond to provide a beta-acyloxy substituted product. The pyrolysis of this product produces the desired alpha, beta-unsaturated acid and the alkanoic acid which can be returned to the oxidation zone. Of the aforementioned alkanoic acids, acetic is the most preferred.

In the oxidative carbonylation it is desirable to initiate the olefin reaction in the presence of an acid anhydride such as the anhydride of a low-boiling alkanoic acid, e.g., acetic, propionic, butyric, isobutyric, valeric, etc. Anhydrides of higher boiling acids and mixed acid anhydrides can also be used, e.g., pivalic, acetic-pivalic, lauric, etc. The oxidative carbonylation is preferably initiated in the presence of a reaction medium containing from 10 to 100 percent of a carboxylic acid with from 1 to 50 weight percent of the acid present as the anhydride. The oxidative carbonylation is also preferably performed with a mixture of a low boiling alkanoic acid having from 1 to about 4 carbons with a higher boiling alkanoic acid having from 4 to about 20 carbons. An example of the preferred mixture for oxidative carbonylation of ethylene is acetic acid 10 to 600 parts, pivalic acid 100 to 1000 parts, anhydrides of the acids 10 to 500 parts. The higher boiling pivalic acid serves as a vehicle for the catalyst and anhydride during distillation of the product (acrylic acid) and the lower boiling acetic acid is recovered as a distillate and recycled to improve the rate of reaction.

As previously mentioned, the reaction medium should contain catalytic amounts of a platinum group metal. The platinum group metal can be of the palladium subgroup or the platinum subgroup, i.e., palladium, rhodium, or ruthenium or platinum, osmium or iridium. While all of these metals are active for the reaction, we prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate, is introduced into the reaction zone to avoid the formation of undesired quantities of water. Examples of suitable salts are the halides and carboxylates of the metals such as platinum chloride, rhodium acetate, ruthenium bromide, osmium propionate, iridium benzoate, palladium isobutyrate, etc. Examples of suitable chelates are palladium acetylacetonate, and complexes of the palladium group metal ions with such conventional chelating agents as ethylene diamine tetraacetic acid, citric acid, etc.

To facilitate the rate of oxidation by rendering it more facile to oxidize the reduced form of the platinum metal, I prefer to employ a reaction medium that contains a soluble halide, i.e., a bromide or chloride. The halide can be added as elemental chlorine or bromine; however, it is preferred to employ less volatile halides such as hydrogen, alkali metal or ammonium halides, e.g., hydrogen chloride; hydrogen bromide, cesium chloride, potassium bromide, lithium chlorate; ammonium bromide, ammonium chloride, etc. Also, any of the aforementioned platinum group metals can be added to supply a portion of the bromide or chloride and, when the hereafter mentioned multivalent redox salts are employed, these too can be added as a chloride or bromide.

In general, sufficient of any of the aforementioned soluble halides can be added to provide between about 0.05 and about 5.0 weight percent halide in the reaction zone; preferably concentrations between about 0.1 and about 3.0 weight percent are employed. This amount of halide is preferably also in excess of the stoichiometric quantity necessary to form the halide of the most oxidized state of platinum group metal, e.g., in excess of two atomic weights of halide per atomic weight of palladium present. In this manner, a rapid oxidation can be achieved.

As previously mentioned, various redox compounds can optionally be used in the reaction medium to accelerate the rate of reaction. In general, any multivalent metal salt having an oxidation potential higher, i.e., more positive than the platinum metal in the solution can be used. Typical of such are the soluble salts of the multivalent metal ions such as the carboxylates, e.g., propionates, benzoates, acetates, etc.; nitrates; sulfates; halides, e.g., bromides, chlorides, etc.; of copper and iron, mercury, nickel, cerium, vanadium, bismuth, tantalum, chromium or molybdenum. Of these, cupric salts are most preferred. In general, the multivalent metal ion salt is added to the reaction medium to provide a concentration of the metal therein between about 0.1 and about 10 weight percent; preferably between about 0.5 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent in the reaction medium or they can be employed jointly with one or more of the aforedescribed redox metal salts such as a combination of a nitrogen oxide and a cupric redox agent or ferric redox agent. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc., can be introduced into contact with the reaction medium during the oxidation to fix the aforementioned nitrogen oxide content therein or soluble nitrate or nitrite salts such as sodium nitrate, lithium nitrate, lithium nitrite, potassium nitrate, cesium nitrate, etc., can be added to the reaction medium.

The oxidative carbonylation process wherein alpha, beta-unsaturated carboxylic acids and beta-acyloxy carboxylic acids are prepared can be operated continuously or batchwise. In the continuous method, oxygen is introduced into the reaction zone together with the olefin and carbon monoxide to contact the liquid reaction medium contained therein. The carbonylation of the olefin and oxidation to the carboxylic acid results in the stoichiometric reduction of the platinum group metal. Introduction of oxygen serves to reoxidize the reduced metal to its more oxidized and active form. The reaction is maintained under substantially anhydrous conditions, i.e., less than about 5 weight percent water in the reaction medium and a continuous preparation of the desired carbonylation product is achieved without need to add a dehydrating agent or strip water from the reaction zone.

The aforementioned oxidation can also be performed in a batchwise process or in a two-stage contacting wherein the olefin is contacted with the reaction medium and thereafter the reaction medium is regenerated by contacting separately with oxygen. This can be performed in a single reaction zone by alternate addition of the olefin and oxygen or, alternatively, can be performed simultaneously in separate reactors while circulating a portion of the reaction medium between the olefin contacting and the oxygen contacting or regeneration zones.

The carbon monoxide is introduced into contact with the reactants at a sufficient rate to insure that the desired carbonylation occurs. Relative ratios of carbon monoxide based on the olefin can be from 1:10 to 10:1 molecular units per molecular weight of olefin. Preferably, to avoid the need to initiate the reaction in the presence of a dehydrating agent, carbon monoxide to ethylene ratios from about 0.5 to about 5 and most preferably from about 1 to about 3 are employed.

The reaction can be performed under relatively mild conditions, e.g., temperatures from about 30° to about 300° C.; preferably from about 90° to about 200° C. The reaction pressure employed is sufficient to maintain a liquid phase and, preferably, when gaseous olefins are employed, superatmospheric pressures are used to increase the solubility of the olefin in the reaction medium and thereby accelerate the reaction rate. Accordingly, pressures from about atmospheric to about 200 atmospheres or more, preferably elevated pressures from about 10 to about 100 atmospheres are used.

The oxygen can be introduced into contact with the liquid reaction medium at a rate controlled in response to the oxygen content of the exit gases from the reaction zone. This rate can be controlled to maintain the oxygen content of the exit gases from the reaction zone less than about 3 and most preferably less than about 1 volume percent. Continuous or intermittent introduction of oxygen can be employed, however, continuous introduction is preferred in the oxidative carbonylation reaction. Preferably, the rate of oxygen introduction is controlled relative to the olefin and carbon monoxide rate so as to maintain the oxygen content of the exit gases below the explosive concentration. Under these conditions, the excess gas, comprising chiefly the olefin and carbon monoxide, can be recycled to the liquid reaction medium. When the olefin is a liquid under the reaction conditions, an inert gas such as nitrogen, air or mixtures of nitrogen and air, can be employed to dilute the gas phase and exit gas stream from the reactor and thereby avoid explosive gas compositions.

During the oxidation, a portion of the liquid reaction medium can be continuously withdrawn and distilled to recover the desired products from the reaction medium that contains catalyst salts and that is recycled for further contact to the reaction zone. Preferably, care is exercised to remove any quantities of water from this recycle stream. The removal of water from the recycle stream can be facilitated by azeotrope forming agent such as a low molecular weight ester, e.g., ethyl acetate, vinyl acetate, etc. to remove all water in the distillation or by the addition of an organic dehydrating agent such as acetic anhydride, acetyl chloride, etc., to the recycle stream.

The following examples will serve to illustrate my invention:

Example 1

The following example will demonstrate the application of my invention to an oxidative carbonylation reaction. The reaction was performed in a one-gallon autoclave to which was charged 150 grams acetic acid, 1 gram palladous chloride, 5 grams sodium chloride, 5 grams sodium acetate trihydrate, 5 grams cupric chloride, 150 grams acetic anhydride and 300 grams pivalic acid. The autoclave was closed and pressured to 450 p.s.i. with carbon monoxide and then an additional 450 p.s.i. of ethylene was introduced. The autoclave was heated to 280° F. and oxygen and nitrogen were alternately added in 20 p.s.i. increments over a 30-minute reaction period. Upon completion of the reaction, the autoclave was cooled, depressured, opened and the liquid contents were vacuum distilled to recover a recycle bottoms fraction comprising 190 grams and a liquid distillate comprising 520 grams having the following composition:

Acetic acid _____ 59.0
Pivalic acid _____ 29.2
Acrylic acid _____ 10.2
Others _____ 1.2

The bottoms recovered from the distillation were admixed with 136 grams pivalic acid, 98 grams acetic anhydride, 2 grams sodium chloride and 190 grams acetic acid. The admixture was then charged to the autoclave and the autoclave was closed and pressured with 450 p.s.i. of carbon monoxide and an additional 450 p.s.i. of ethylene. The autoclave was then heated to 280° F. and oxygen and nitrogen were alternately added in 20 p.s.i. increments over a 30-minute reaction period. Upon completion of the reaction, the autoclave was cooled, depressured and opened and the liquid contents were vacuum distilled to recover 527 grams of distillate and 201 grams of a bottoms fraction. The distillate had the following composition:

Acetic acid _____ 67.0
Pivalic acid _____ 21.5
Acrylic acid _____ 11.5

The bottoms fraction was admixed with 115 grams pivalic acid, 116 grams acetic anhydride, 184 grams acetic acid and 2 grams sodium chloride and recharged to the autoclave which was closed and pressured with 450 p.s.i. carbon monoxide and 450 p.s.i. ethylene. The autoclave was heated to 280° F. and oxygen and nitrogen were alternately added in 20 p.s.i. increments over a 30-minute reaction period. The autoclave was then cooled, depressured, opened and the liquid contents were vacuum distilled at 20 mm., Hg vacuum to recover 539 grams of a distillate and a bottoms fraction comprising 175 grams. The distillate had the following composition:

Acetic acid _____ 68.5
Pivalic acid _____ 14.3
Acrylic acid _____ 17.2

To the bottoms were added 141 grams pivalic acid, 113 grams acetic anhydride, 187 grams acetic acid and 2 grams sodium chloride. The resulting mixture was recharged to the autoclave and the autoclave was closed and pressured to 450 p.s.i. with ethylene and an additional 450 p.s.i. of carbon monoxide was then introduced. The autoclave was then heated to 280° F. and oxygen and nitrogen were alternately added in 20 p.s.i. increments over a 30-minute reaction period. The autoclave was then cooled, depressured, opened and the liquid contents were vacuum distilled at 20 millimeters mercury vacuum to recover a distillate comprising 464 grams from a bottoms fraction comprising 150 grams. The distillate had the following composition:

Acetic acid _____ 66.1
Pivalic acid _____ 27.9
Acrylic acid _____ 5.1
Other _____ 0.9

A portion of the bottoms fraction (residue) from the aforementioned distillation comprising 92 grams was admixed with 100 milliliters of water and 5 milliliters concentrated (36 weight percent) hydrochloric acid and 2 milliliters concentrated (70 weight percent) nitric acid. The admixture was heated on a steam bath for 10 minutes and then 100 grams of ethylidene diacetate and 150 grams water were added. The mixture was shaken and then allowed to settle into 2 layers which were readily separated. The organic upper layer was decanted and the lower aqueous layer was centrifuged and the solid collected, washed and dried to recover a solid which contained 46.4 weight percent palladium and 0.85 weight percent copper. The aqueous phase was analyzed and found to contain 0.01 weight percent palladium and 0.14 weight percent copper. The decanted organic phase was found to contain a reduced quantity of palladium and copper. When repeated treatments of the organic phase are practiced, substantially all the catalyst salts can be recovered.

When the residue is contacted with dilute aqua regia and no organic diluent is added, a clean separation between the organic and aqueous phases can not be achieved and a large quantity of the organic material tends to adhere to the surfaces of the separation equipment.

The preceding example demonstrates the oxidation of an olefin to an oxygenated, unsaturated product and illustrates the difficulties encountered in the formation of a high-boiling residual byproduct of the oxidation. The example further demonstrates that the catalyst components can not be readily separated from the high-boiling recycle reaction medium unless an organic diluent is added.

Example 2

A tarry residue fraction was obtained from a similar series of experiments and a number of organic liquids were tested in an attempt to dissolve this tarry fraction. The following table summarizes the results of this testing:

Organic diluent:       Solubility of reaction medium tar
    Pivalic acid _____ Not soluble.
    Orthodichlorobenzene _____ Not soluble.
    Nitrobenzene _____ Not soluble.
    Water _____ Not soluble.
    Ethylene glycol diacetate _____ Soluble.
    Ethylidene diacetate _____ Soluble.
    Ethyl acetate _____ Soluble.
    Normal butanol _____ Soluble.
    Diphenyl ether _____ Not soluble.
    t-Amyl alcohol _____ Soluble.
    Cyclohexanol _____ Soluble.
    Decanol _____ Not soluble.
    Isodecanol _____ Not soluble.
    Cyclohexanone _____ Soluble.
    2-octanone _____ Not soluble.
    Dimethyl succinate _____ Soluble.
    Butyl acetate _____ Soluble.
    Diethyl oxalate _____ Soluble.
    Phenyl pivalate _____ Not soluble.
    Butyl oxalate _____ Not soluble.
    Phenyl acetate _____ Not soluble.
    2-ethylhexyl acetate _____ Not soluble.

The preceding example demonstrates the type and molecular size of various organic diluents which have a solvency for the tarry residue formed in the distillation.

It is not intended that the preceding examples be construed as unduly limiting of the invention but rather it is intended that the invention be defined by the reagents and steps and their obvious equivalents set forth in the following claims:

I claim:

1. In the oxidative carbonylation of a hydrocarbon olefin having from 2 to about 5 carbons to an oxygenated product thereof wherein the olefin and carbon monoxide are introduced into a reaction zone to contact, under substantially anhydrous conditions, an organic reaction medium comprising a low molecular weight, alkanoic acid which contains a catalyst consisting of from 0.001 to 5 weight percent of a platinum group metal bromide or chloride and from 0.1 to 10 weight percent of a redox agent selected from the class consisting of the soluble salts of nitrogen oxides and of multivalent metals having oxidation potentials more positive than said platinum group metal in said reaction medium to form said oxidized products and to reduce the catalyst to a lower oxidation state and wherein the reaction medium is contacted with oxygen to restore said catalyst to its higher oxidation state, the improved method for preventing permanent deactivation of the catalyst containing medium for the reaction which comprises removing from 1 to about 20 weight percent of the reaction medium from the remainder of said medium, distilling said removed portion to recover reaction products and solvent, reacting the tarry residue from said distillation with from 0.5 to 10 volumes of a strong mineral acid selected from the class consisting of nitric, sulfuric and hydrohalic acids forming mixtures thereof at a temperature from about 20° to about 150° and adding from 1 to about 50 volumes of an organic diluent having from 4 to about 7 carbons and selected from the class consisting of monohydroxy acyclic and alicyclic alcohols and ketones and esters of acyclic monocarboxylic acids and acyclic and alicyclic alcohols and glycols and esters of dicarboxylic acids and acyclic alcohols, separating the resulting admixture into an organic and an aqueous phase and separating the aqueous phase therefrom and recovering the catalyst values from said separated aqueous phase.

2. The oxidation of claim 1 wherein said residue is reacted with a mixture of nitric and chloric acids.

3. The oxidation of claim 1 wherein said organic diluent is ethylene glycol diacetate.

4. The oxidation of claim 1 wherein said organic diluent is ethylidene diacetate.

5. The oxidation of claim 1 wherein said catalyst is palladium chloride.

6. The oxidation of claim 1 wherein said olefin is ethylene and said oxygenated product is acrylic acid and a beta-lower alkanoyloxypropionic acid.

7. The oxidation of claim 1 wherein said redox agent is cupric chloride.

References Cited
UNITED STATES PATENTS

| | | | |
|---|---|---|---|
| 3,119,875 | 1/1964 | Steinmetz et al. | 260—604 |
| 3,121,673 | 2/1964 | Riemenschneider et al. | 260—604 |
| 3,210,152 | 10/1965 | Van Helden et al. | 260—497 |
| 3,349,119 | 10/1967 | Fenton et al. | 260—497 |

FOREIGN PATENTS 6,408,476  1/1965  Netherlands.

OTHER REFERENCES

Tsuji et al., Tetrahedron Letters, No. 16, pp. 1061–1064, 1963.

LORRAINE A. WEINBERGER, *Primary Examiner.*

V. GARNER, *Assistant Examiner.*

U.S. Cl. X.R.

260—533, 604; 252—415